H. W. BEERS.
ELECTRIC HEATER.
APPLICATION FILED AUG. 22, 1912.
1,065,426.
Patented June 24, 1913.
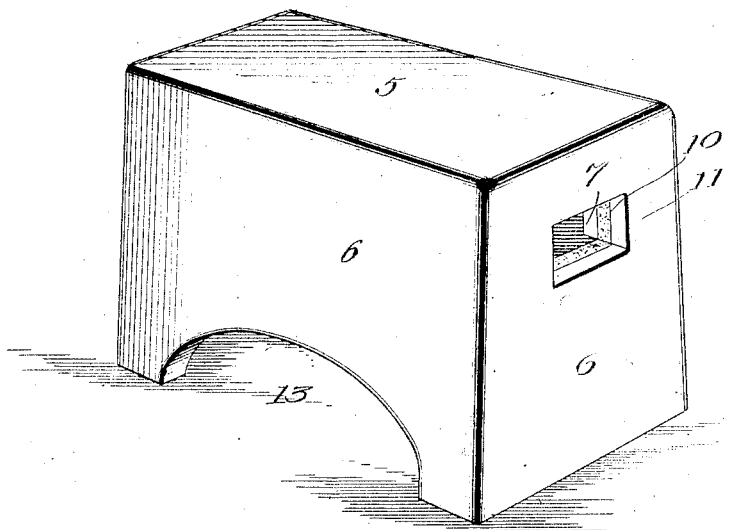
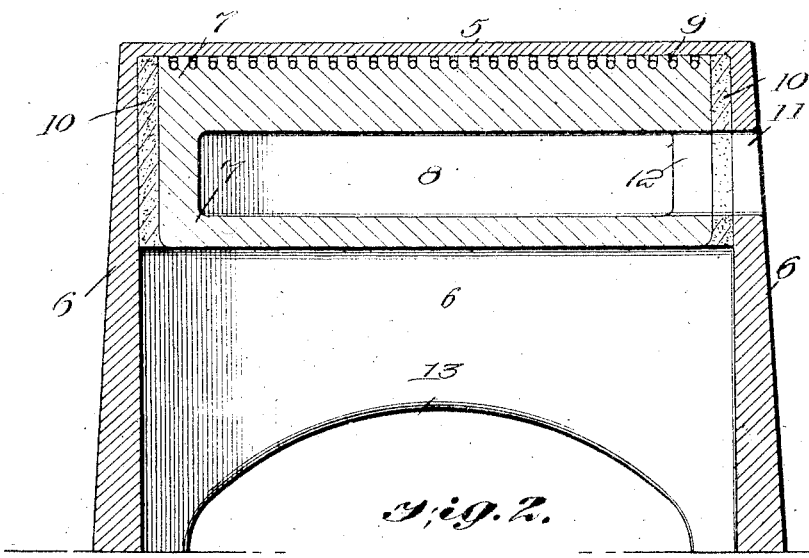
WITNESSES
INVENTOR
HENRY W. BEERS
Attorney.

UNITED STATES PATENT OFFICE.

HENRY W. BEERS, OF GUADALAJARA, MEXICO, ASSIGNOR OF ONE-HALF TO ROY EPPERSON, OF DENVER, COLORADO.

ELECTRIC HEATER.

1,065,426.      Specification of Letters Patent.      Patented June 24, 1913.

Application filed August 22, 1912. Serial No. 716,469.

*To all whom it may concern:*

Be it known that I, HENRY W. BEERS, a citizen of the United States, residing at Guadalajara, in the State of Jalisco, Mexico, have invented certain new and useful Improvements in Electric Heaters, of which the following is a specification.

This invention relates to electric heaters of the portable type characterized by a body of refractory material which incloses the resistance or heating element.

It is the object of the present invention to provide a simple, inexpensive and efficient heater of the kind stated, and to this end, the invention consists in a novel combination and arrangement of parts to be hereinafter described and claimed.

In the accompanying drawing forming a part of this specification, Figure 1 is a perspective view of the heater. Fig. 2 is a longitudinal section thereof.

Referring specifically to the drawing, the body of the heater is composed of a casing which incloses a support for the heating coils. The casing comprises a flat top 5 and side walls 6, the casing being open at the bottom, and the side walls serving as legs to support the heater. The support for the heating coils comprises a block 7 having a hollow space 8 in its interior, to retain the heat. The top of the block has grooves 9 in which the heating coils are mounted, and said top fits against the under side of the top 5, the latter therefore serving as a cover for the heating coils. The block is located within the side walls 6 and is thus inclosed in the casing, it being held in place therein by a filling 10 of asbestos or other suitable material between said side walls 6 of the casing and the sides of the block.

In one of the side walls 6 of the casing is an opening 11 which registers with an opening 12 in one side of the block 7, the last-mentioned opening communicating with the hollow space 8 in said block. In two opposite ones of the walls 6, at the base thereof, are openings 13 to allow escape of heat from the bottom portion of the block 7. The openings 11 and 12 are provided in order that a curling iron or other tool to be heated may be inserted into the space 8.

The casing and the block are molded out of clay or other suitable plastic material. The casing is in one piece and serves as a cover for the heater as well as a supporting stand. The block 7 is located some distance above the base of the casing which prevents the heat from reaching the table or other support on which the heater may be standing.

The heater herein described is very simple in structure and can be easily and cheaply produced, and it effectively serves the purpose for which it is designed.

I claim:

1. An electric heater comprising a casing having an open bottom, and a block mounted within the casing against the under side of the top thereof, the top of the block having grooves to hold a heating element, said block having a hollow space in its interior opening through one side thereof, and the casing having an opening which communicates with said space.

2. An electric heater comprising a casing consisting of a top and side walls, said walls having openings at their base, and a block mounted within the side walls and against the under side of the top of the casing, the top of the block having grooves to hold a heating element, said block having a hollow space in its interior opening through one side thereof, and one of the side walls of the casing having an opening which communicates with said space.

3. An electric heater comprising a casing comprising a top, side walls and an open bottom, one of the side walls having an opening, and a support for a heating coil mounted in the casing above the bottom thereof, said support having a hollow space opening through one side in line with the opening of the side wall of the casing.

4. An electric heater comprising a casing comprising a top, side walls and an open bottom, one of the side walls having an opening, a block mounted in the casing adjacent to the top thereof, said block having a hollow space opening through one side in line with the opening of the side wall of the casing, and a heating coil in the casing between the top thereof and the block.

In testimony whereof I affix my signature in presence of two witnesses.

HENRY W. BEERS.

Witnesses:
     TH. PUTNAM,
     GEORGE MAYERS.